United States Patent Office 3,459,730
Patented Aug. 5, 1969

3,459,730
DISAZO PIGMENTS
Ernfred Peer Ottokar Schnabel, Reinach, Basel-Land, and Emil Stocker, Riehen, Switzerland, assignors to J. R. Geigy, A.G., Basel, Switzerland
No Drawing. Filed Aug. 9, 1966, Ser. No. 571,184
Int. Cl. C09b *31/02, 33/02, 35/02*
U.S. Cl. 260—184                          3 Claims

ABSTRACT OF THE DISCLOSURE

The pigments of the formula

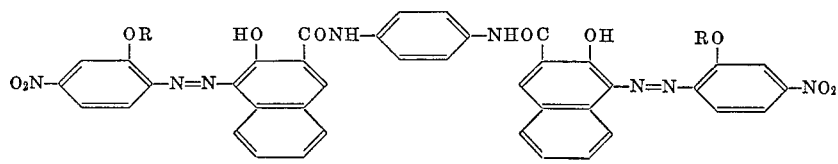

wherein R is methyl or ethyl are claret coloured and useful for the pigmentation of plastics, printing inks, paints and lacquers.

---

The present invention relates to new disazo pigments and to processes for the pigmenting of polymeric organic materials with these pigments as well as, as industrial products, polymeric organic materials pigmented with the new disazo pigments.

It has been found that valuable claret coloured disazo pigments are obtained if two equivalents of the diazonium compound of 1-amino - 2 - methoxy - 4 - nitrobenzene or 1-amino-2-ethoxy-4-nitrobenzene are coupled with one equivalent of 1,4-bis-[2'-hydroxy-naphthoyl-(3')-amino]-benzene to form a disazo pigment of Formula I

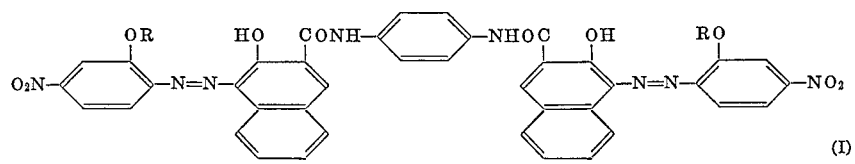

(I)

wherein R represents the methyl or ethyl group.

Coupling is effected by adding dropwise an aqueous-alkaline solution of the coupling component in the presence of the usual auxiliaries which promote azo coupling to the aqueous solution of the diazonium compound whereby the average particle size of the coupling compound, which is only very slightly soluble in the acid coupling mixture, and of the dyestuff formed is kept below $5\mu$ by the use of comminuting forces.

These comminuting forces are advantageously produced by friction, particularly by mechanical friction, of the dispersion on solid bodies. For the practical performance of the process chiefly ball or sand mills, anchor stirrers, high-speed stirrers which, preferably, are fitted with rotors and stators, also hopper mills fitted with a grinding disc, high pressure mills or supersonic apparatus are used to attain the necessary friction.

Principally, chemically inert, non-ionogenic, anionactive or cationactive dispersing agents are used as auxiliaries which promote the azo coupling, for example alkylaryl sulphonates such as dodecylbenzene sulphonate, or aralkylaryl sulphonates such as alkali metal salts of products obtained by condensation of a mixture of naphthalene sulphonic acids and formaldehyde, polyalkyleneoxide addition products, e.g. products obtained by the addition of multiple stoichiometric amounts of alkylene oxides, especially ethylene oxide, to higher fatty alcohols or higher fatty acids; moreover inert, water-miscible organic solvents such as low aliphatic carboxylic acids, e.g. acetic acid, low alkanols, e.g. methanol, ethanol, isopropanol, or ethylene glycol monomethyl- or -ethyl ether, amides of low fatty acids such as dimethyl formamide, or also non-coupling organic nitrogen bases such as triethanolamine or pyridine, or relatively small amounts of organic solvents which are not miscible with water such as aromatic hydrocarbons which, optionally, can be halogenated or nitrated, e.g. benzene, toluene, xylenes, tetrahydronaphthalene, chlorobenzene, dichlorobenzenes or nitrobenzene, certain aliphatic halogenated hydrocarbons such as carbon tetrachloride or trichloroethylene.

The new pigments precipitate from the reaction mixture immediately after coupling. They are isolated and purified in the usual way of filtration and washing. Depending on its use, the crude pigment press cake can be dried and milled, worked up to obtain aqueous pastes or flushed in organic media.

A modification of the process according to the invention consists in condensing, in molar ratio of 2:1, a monoazo dyestuff carboxylic acid halide of Formula II $$\text{O}_2\text{N}-\text{C}_6\text{H}_3(\text{OR})-\text{N}=\text{N}-\text{(naphthyl)}(\text{OH})-\text{CO-Hal}$$

(II)

wherein:

R represents the methyl or ethyl group and
Hal represents bromine or, particularly, chlorine, with 1,4-diaminobenzene, to form a disazo pigment of Formula I.

The monoazo dyestuff carboxylic acid halide of Formula II usable as starting material is obtained advantageously by treating the corresponding monoazo dyestuff carboxylic acid with halogenating agents such as phosphorus pentachloride, phosphorus oxychloride or thionyl chloride. The carboxylic acid is halogenated to form the acid halide preferably in organic solvents such as in optionally halogenated or nitrated hydrocarbons, e.g. in benzene, toluene, xylenes or mono- and di-chlorobenzenes or nitrobenzene.

The acid halides of Formula II are condensed with 1,4-diaminobenzene preferably using an excess of the former and, advantageously, in an organic solvent, e.g. in one of those mentioned in the previous paragraph. In some cases it is recommended to perform the condensation at a raised temperature in the presence of an acid binding agent, e.g. a tertiary organic nitrogen base such as pyridine.

It is also possible to perform the halogenation of the monoazo dyestuff carboxylic acid to form the acid halide of Formula II and the condensation of the latter with 1,4-diaminobenzene in one step without isolation of the acid halide.

The new disazo pigments of Formula I are isolated in the usual way, particularly by filtration.

The new claret coloured pigments have good fastness properties and are distinguished by great colour strength. For certain purposes the crude pigments can be used directly; however, their properties, particularly with regard to purity and form, can be further improved by methods known per se, for example by crystallising or extracting with organic solvents or by milling with milling auxiliaries which can subsequently be removed, e.g. salts.

The disazo pigments of Formula I according to the invention are suitable for the pigmenting of polymeric organic material, especially in printing inks for the graphic industry, particularly for paper printing, moreover in paints based on water such as emulsion paints, in lacquers of various types, e.g. nitro or stoving lacquers, or in alkyd resin lacquers. They can also be used for the pigmenting of plastics such as polyethylene, polystyrene, polyvinyl chloride, which latter can also contain plasticisers, particularly hard polyvinyl chloride, of cellulose esters, especially for the spin dyeing of viscose or cellulose acetate, of resins which can be cured, or for the pigmenting of rubber, as well as for colouring paper pulp, for the coating of sheet materials, e.g. in the production of paper laminates or of leather cloth, as well as for the printing and pad-dyeing of textiles with pigments.

With the new disazo pigments very strong, pure claret coloured dyeings having good fastness to light are obtained on these materials. They are superior to the claret coloured pigment of Formula III

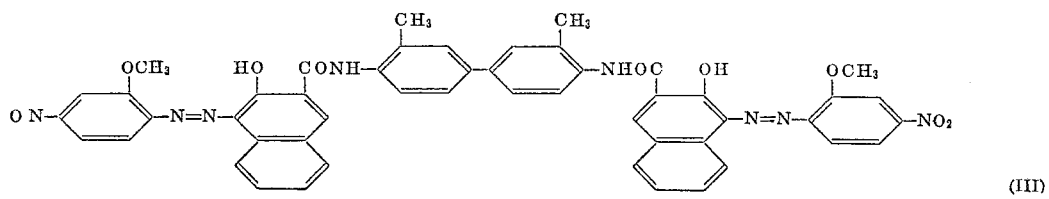

(III)

known from Swiss Patent No. 300.780, with regard to their fastness to migration in polyvinyl chloride containing plasticiser which, in view of the smaller molecular weight of the pigments according to the invention, is surprising. They also have greater fastness to light and cross-lacquering than the previously known pigment of Formula III. Due to the high colour strength of the new pigments strong printing inks having good rheological properties and relatively thin printing films can be obtained.

The following examples illustrate the invention. The temperatures therein are given in degrees centigrade.

Example 1

16.8 g. of 1-amino-2-methoxy-4-nitrobenzene are added to a mixture of 40 ml. of 10 N hydrochloric acid, 20 g. of a 5% solution of the condensation product of 18–20 mols of ethylene oxide and stearyl alcohol and 50 ml. of water and the whole is slurried for 1–2 hours. 350 ml. of ice water are added to this slurry and diazotation is effected at about 0° with 22.2 g. of 33.3% aqueous solution of sodium nitrite. As soon as a clear solution has formed, excess nitrous acid is decomposed by the addition of solid sulphamic acid, 95 ml. of 2 N sodium acetate solution and 10 ml. of xylene are added and then, while stirring vigorously by means of a high speed stirrer, a solution of 22.4 g. of 1,4-bis-[2'-hydroxynaphthoyl-(3')-amino]-benzene in 75 ml. of 2 N sodium hydroxide solution, 40 ml. of ethanol and 500 ml. of water is added dropwise to the diazonium salt solution obtained. After having added all the coupling component the high speed stirrer is removed and the coupling mixture is then stirred for a while at room temperature by means of a conventional anchor stirrer until the coupling is complete. The disazo pigment formed is filtered off, washed thoroughly with water and dried at about 100°.

38.6 g. of a red-brown crude pigment (95.8% of the theoretical) are obtained which is excellently suitable for pigmenting polyvinyl chloride containing plasticiser in claret coloured shades having good fastness to migration.

20.0 g. of this crude pigment are added to 360 g. of dry nitrobenzene and the whole is stirred for 2–3 hours at a temperature of 200° and then filtered at a temperature of 100°. The filter cake is washed with warm nitrobenzene until the washing water is colourless, the nitrobenzene is removed from the filter cake with methanol and the pigment is dried at about 100°.

18.2 g. of finely crystalline pigment of soft texture (91.0% of the weight of crude pigment used) are obtained. Polyvinyl chloride containing plasticiser pigmented with this refined pigment has slightly better fastness properties than that obtained with the crude pigment.

Example 2

18.2 g. of 1-amino-2-ethoxy-4-nitrobenzene are dissolved in 250 ml. of acetic acid. To this solution 150 ml. of 2 N hydrochloric acid are added and the mixture is diazotised at about 8–12° with 105 ml. of a 1 N solution of sodium nitrite. As soon s a clear solution has formed, excess nitrous acid is decomposed by the addition of solid sulphanic acid; 10 ml. of xylene (isomeric mixture), 20 g. of a 5% aqueous solution of the condensation product of 18–20 mols of ethylene oxide and stearyl alcohol, and 95 ml. of a 2 N sodium acetate solution are then added to the solution and, while stirring vigorously by means of a high speed stirrer, a solution of 22.4 g. of 1,4-bis-[2'-hydroxynaphthoyl-(3')-amino]-benzene in 75 ml. of 2 N sodium hydroxide solution, 40 ml. of ethanol and 500 ml. of water is added dropwise to the diazonium salt solution obtained. After the addition of the coupling compounds the high speed stirrer is removed and the whole is stirred at room temperature by means of a conventional anchor stirrer until the coupling is complete. The disazo pigment formed is filtered off, washed thoroughly with water, dried at about 50° and pulverised.

A red-brown pigment is obtained with which polyvinyl chloride containing plasticiser can be pigmented in claret coloured shades having good fastness to migration.

20.0 g. of this crude pigment are further treated as described in Example 1. A finely crystalline pigment of soft texture is obtained with which polyvinyl chloride containing plasticiser can be pigmented in claret coloured shades. These pigments have slightly better fastness properties than those obtained with the crude pigment.

Example 3

45.7 g. of the coupling product of diazotised 1-amino-2-methoxy-4-nitrobenzene and 2 - hydroxy - 3 - naphthoic acid are suspended in 750 ml. of chlorobenzene. To complete dehydration, 100 ml. of chlorobenzene are distilled off and, at 70°, 18.8 g. of distilled thionyl chloride are added to the suspension within 5 minutes. The reaction mixture is then boiled for about 5 hours, the precipitated monoazo dyestuff carboxylic acid chloride formed is filtered off at boiling temperature, washed with a little chlorobenzene and dried at 70° in vacuo.

The carboxylic acid chloride mentioned is obtained in the form of greenish-shimmering crystals which melt at 268–269° (with decomposition). After about 24 hours, another fraction of the above acid chloride crystallises out of the mother liquor. It melts at 269–271° (with decomposition).

15.7 g. of this monoazo dyestuff carboxylic acid chloride are suspended in 500 ml. of dry toluene. 2.0 g. of dry 1,4-diaminobenzene suspended in 80 ml. of dry toluene are added to the suspension at boiling temperature (110°). The condensation to form the disazo pigment begins immediately. Boiling of the reaction mixture under reflux is continued for 23–25 hours until no more hydrochloric acid is evolved, the pigment formed which has crystallised out is filtered from the still hot suspension, washed with warm toluene until the washing liquid is colourless and dried at 70° in vacuo.

A red-brown pigment powder is obtained which is very similar to that obtained according to Example 1, paragraph 2.

If 16.2 g. of the monoazo dyestuff chloride, obtained by the reaction of 47.6 g. of the coupling product of diazotized 1-amino-2-ethoxy-4-nitrobenzene and 2-hydroxy-3-naphtoic acid with thionyl chloride according to the procedure of this example, are condensed with 2.0 g. of 1.4-diaminobenzene, following the procedure of this example, a red brown pigment powder is obtained which substantially corresponds to that obtained according to Example 2, paragraph 2.

Example 4

A stabilised mixture of:                                g.
Polyvinyl chloride (of K-value 70) _____ 67
Dioctyl phthalate _____ 33
Dibutyl tin dilaurate _____ 2
Sodium-barium organophosphate, e.g. Ferroclere 541 A(R), as light stabiliser _____ 0.3
Titanium dioxide _____ 2
and
Disazo pigment according to Example 1, paragraph 2 _____ 0.65 are mixed on a set of mixing rollers at 160° and the mixture is then drawn off as a sheet of 0.4 mm. thickness. The pure claret-red colouring has good fastness to migration, rubbing and heat.

If instead of the crude pigment according to paragraph 2 of Example 1, the refined pigment according to paragraph 4 of the same example is used, then, with otherwise the same procedure, pigmentings are obtained the fastness properties of which are slightly improved compared with those of the crude pigment.

If instead of 0.65 g. of the disazo pigment according to Example 1, paragraph 2 an equivalent amount of the disazo pigment according to Example 2, paragraph 2 is used and otherwise the procedure described in this example is followed, claret coloured pigmentings having similar properties are obtained.

Example 5

A stoving lacquer made from:                         g.
Titanium dioxide (Rutil) _____ 20
60% solution of coconut alkyd resin (oil content of the resin 32%) in xylene _____ 40
50% solution of melamin resin in butanol _____ 24
Xylene _____ 8
Ethylene glycol monomethyl ether _____ 7
and The disazo pigment according to Example 2, paragraph 2 _____ 1 is finely milled in a ball mill, sprayed onto an aluminium foil, allowed to dry and then stoved for 30 minutes at 120°. The pure, claret-red colouring has very good fastness to light, cross-lacquering and heat.

If instead of 1 g. of the disazo pigment according to Example 2, paragraph 2 an equivalent amount of the disazo pigment according to paragraph 2 of Example 1 is used then, with otherwise the same procedure, of pure claret coloured shade having similar fastness properties is obtained.

Example 6

A printing ink is produced on a set of three mixing rollers from:
                                                                g.
Disazo pigment according to Example 1 (crude or refined pigment) _____ 10
Alumina white _____ 30
and
Litho varnish _____ 60

The prints obtained therewith in typography are distinguished by a beautiful claret shade and very good fastness to solvents and light.

Example 7

1.0 g. of the pigment obtained according to Example 2, and
4.0 g. of a litho varnish of the composition:
    29.4% linseed oil-stand oil (300 poise)
    67.2% linseed oil-stand oil (20 poise)
    2.1% cobalt octoate (8% Co) and
    1.3% lead octoate (24% Pb)

are finely ground on an Engelsmann machine and then, with the aid of a cliché, printed onto art printing paper by the letterpress process (1 g./sq. m.). A strong, claret coloured print is obtained.

Example 6

A mixture of:                                    Parts by weight
Dispersion polymerized polyvinyl chloride of K-value 70, e.g. Vestolit B 7021 _____ 25
Dispersion polymerized polyvinyl chloride of K-value 80, e.g. Vestolit E 8001 _____ 75
Dioctyl phthalate _____ 32
Dibutyl tin dilaurate _____ 1
Sodium-barium organophosphate, e.g. Ferroclere 541A(R) as light stabiliser _____ 0.25
Finely ground chalk _____ 6
Sangajol (a petroleum hydrocarbon of boiling range from 140° to 200°) _____ 10.75
Disazo pigment according to Example 1 (crude or refined pigment) _____ 0.5 is milled into a paste in a ball mill.

Linen fabric is coated with this paste and the fabric is then heated to about 160–180°. This procedure is repeated twice.

In this way, level, claret coloured leather cloth is obtained. The pigmenting has good fastness to migration.

We claim:
1. A disazo pigment of the formula

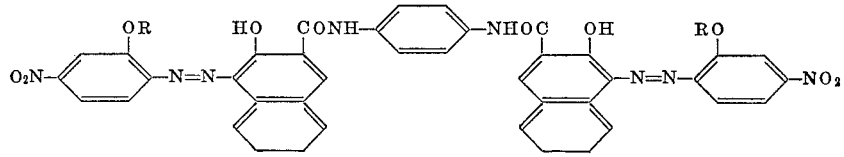

wherein R represents methyl or ethyl.
2. A disazo pigment as defined in claim 1, wherein R represents methyl.
3. A disazo pigment as defined in claim 1, wherein R represents ethyl.

References Cited

UNITED STATES PATENTS 1,819,103  8/1931  Laska et al. _____ 260—184

FOREIGN PATENTS 780,031  7/1957  Great Britain.

CHARLES B. PARKER, Primary Examiner
DONALD M. PAPUGA, Assistant Examiner

U.S. Cl. X.R.

106—23, 204, 288; 117—121, 142, 154; 260—202

PO-1050
(5/69)

UNITED STATES PATENT OFFICE
CERTIFICATE OF CORRECTION

Patent No. 3,459,730    Dated   August 5, 1969

Inventor(s) Ernfred Peer Ottokar Schnable and Emil Stocker

It is certified that error appears in the above-identified patent and that said Letters Patent are hereby corrected as shown below:

"Claims priority, applications Switzerland
August 19, 1965   11.687/65 and
July 15, 1966    10.334/66."

SIGNED AND
SEALED
DEC 23 1969

(SEAL)
Attest:

Edward M. Fletcher, Jr.
Attesting Officer

WILLIAM E. SCHUYLER, JR
Commissioner of Patents